Patented Oct. 3, 1939

2,174,614

UNITED STATES PATENT OFFICE 2,174,614

METHOD OF PRODUCING POLYPHOSPHATES AND POLYPHOSPHATE MIXTURES

Ferdinand Bornemann, Wiesbaden-Biebrich, and Hans Huber, Wiesbaden, Germany

No Drawing. Application December 28, 1936, Serial No. 118,024. In Germany April 9, 1936

3 Claims. (Cl. 23—106)

Our invention relates to polyphosphates, and the object of the present invention is to devise a practical process of producing polyphosphates and mixtures containing the same whereby a larger yield is insured.

It has already been discovered that by the calcination of mixtures of primary and secondary alkali orthophosphates at temperatures below the sintering point polyphosphates can be obtained, which are especially suitable as detergents, cleansing and water purifying agents, for example, as dispersion agents and solvents for lime soap. Until then, polyphosphates were obtained only from the melts of mixtures of sodium meta- and sodium pyrophosphates. Schwarz made sodium polyphosphate of the formula $Na_5P_3O_{10}$ with 6 or 8 $H_2O$, by dissolving in cold water a molten and slowly cooled mixture of 100 grams of $Na_4P_2O_7$ and 50–55 grams of $NaPO_3$ and allowing the resulting solution to evaporate until crystallization commenced. The sudden chilling of the said melt as well as the slow cooling of a melt which resulted from 100 grams of $Na_4P_2O_7$ and 38.5 grams of $NaPO_3$ exactly corresponding to the proportion of $Na_2O:P_2O_5$ equal to 5:3, was the cause that "a portion of the melt becomes immediately reconverted into pyro- and metaphosphate" and that "the solution even after the first crystallisation is greatly enriched with metaphosphate". A sodium polyphosphate of the formula $Na_6P_4O_{13}.XH_2O$ was made by Fleitmann and Henneberg, who melted together a mixture of 100 grams of $Na_4P_2O_7$ and 76.87 grams of $NaPO_3$ exactly corresponding to the proportion of $Na_2O:P_2O_5$ equal to 6:4 and after the mixture had been cooled and powdered, dissolved the same in hot water not sufficient for a complete solution and then, after the separation of the undissolved residue, caused the crystallisation of the filtrate over sulphuric acid, or in contact with air.

Uelsmann and Schwarz repeated these manufacturing processes. Uelsmann emptied the crucible by pouring out the fused polyphosphate. Schwarz proceeded as in the manufacture of tetraphosphate which is analogous to that of triphosphate and used for 100 grams of $Na_4P_2O_7$ 80 grams of $(NaPO_3)$. Both fixed the water content of the tetraphosphate $Na_6P_4O_{13}$ which had crystallised out at $18H_2O$.

Salzer, however, could not confirm the manufacture of the tetraphosphate by the dehydration and the melting of $Na_3HP_2O_7$. He says: "The strongly alkaline solution of the melt never gave me crystals, but desiccated into gum".

Moreover, Salzer found that the "Fleitmann-Henneberg sodium salt $Na_6P_4O_{13}$ is not identical with Uelsmann's salt". At last, Parravano and Calcagni have systematically examined the melt diagram of $NaPO_3$—$Na_4P_2O_7$ without finding any indication of the existence of polyphosphates. Later proposals for the manufacture of sodium tetrapolyphosphate differ merely by the selection of the initial materials.

From sodium phosphate melts, in which the proportion of $Na_2O:P_2O_5$ lies between 1:1 and 2:1, the technically active agents have heretofore been produced in this way that the liquid state of the melt was converted into the solid state of aggregation as rapidly as possible, which was accomplished by the chilling of the melt. The object of this heat treatment of rapidly cooling the molten phase was to obtain the product as so-called hexameta phosphate, for it was known that a pure meta stable metaphosphate melt, in which the $Na_2O:P_2O_5$ proportion is 1:1 is converted into the less effective so-called trimetaphosphate, if one cools slowly and the temperature below the softening point is maintained constant for some time, that is to say, if the solidified hexametaphosphate melt is tempered. The temperature range, in which the crystalline so-called trimetaphosphate is formed from the amorphous so-called hexameta-phosphate and is stable, was found to be between 505° C. and 607° C.

This experimental fact then was directly applied from the pure metaphosphate melt to the melts of mixtures of primary and secondary alkali ortho-phosphates and it was quite arbitrarily assumed that when said melts are tempered below the solidifying point, pyrophosphate is formed in addition to trimetaphosphate, the same as pyrophosphate is formed besides hexametaphosphate in the rapidly cooled melts.

Now, we have discovered the astonishing fact that the polyphosphates $Na_5P_3O_{10}$ and $Na_6P_4O_{13}$ are produced from the melts only, if the melts below the melting point within the temperature range of 650° C. to 250° C. are very slowly cooled. In accordance with the present invention we have found that melts having a $Na_2O:P_2O_5$ proportion lying between 3:3 and 5:3 and which are extremely slowly cooled, i. e. tempered, from 650° to 250° C., contain tripolyphosphate $Na_5P_3O_{10}$ besides trimetaphosphate, and that melts having an $Na_2O:P_2O_5$ proportion lying between 5:3 and 6:3 (or 2:1), contain after extremely slow cooling tripolyphosphate besides pyrophosphate. A belt, therefore, which contains exactly $5Na_2O$ and $3P_2O_5$ and which is tempered while being cooled between 650° C. and 250° C. is completely converted into tripolyphosphate.

The detection of the complete conversion of such a $5Na_2O.3P_2O_5$ melt into $Na_5P_3O_{10}$ can be made according to the present invention in the following manner. The tripolyphosphate is a well defined salt, which at ordinary temperature crystallizes out from the aqueous solution with $8H_2O$ and in acetic solution with zinc salt does not form the amorphous zinc pyrophasphate precipitate, but the crystalline zinc sodium tripolyphosphate separation $Zn_2NaP_3O_{10}.9.5H_2O$, also in the presence of sodium-trimetaphosphate. Since tripolyphosphate $Na_5P_3O_{10}$, however, is at elevated temperature sarcely more soluble than at ordinary temperature and decomposes upon the evaporation of the aqueous solution, it can be readily and completely obtained only through the crystallization in the presence of an electrolytically dissociated sodium compound: Sodium tripolyphosphate is only difficultly soluble in a concentrated sodium salt solution and, therefore, when introduced into such a solution of a sodium salt is practically completely converted into $Na_5P_3O_{10}.8H_2O$.

Therefore, if the melt containing $5Na_2O$ and $3P_2O_5$ is rapidly cooled from 900° C. to room temperature, only the neutral pyrophosphate crystallizes out of the hot saturated aqueous solution; the component of the melt rich in phosphoric acid, even by the addition of sodium salt to the concentrated solution can not be separated therefrom. Thus it is clear, that in the solidified melt there is not contained any tripolyphosphate. If the same melt (according to Schwarz) is gradually cooled in about five hours from 900° C. to room temperature, still the neutral pyrophosphate $Na_4P_2O_7.10H_2O$ crystallizes out of the saturated solution in the shape of fine needles; from the concentrated turpentine-like mother liquor, however, upon the addition of sodium chloride, $Na_5P_3O_{10}.8H_2O$ separates in rectangular foils. The yield, however, is completely insufficient and amounts to only about 25%.

If, in accordance with the present invention, the same melt is cooled within several days from 900° C. to room temperature, so that the glow product is tempered for several hours below the softening point from 650° C. to 250° C., the melt practically consists entirely of $Na_5P_3O_{10}$. The mass is completely crystalline and contains only slight amounts of pyrophosphate, which in the diluted solution with zinc solution can hardly be detected. If this melt which during the cooling decomposes into a fine powder is dissolved in cold water, in the proportion of 100 grams of melt to 600 grams of water, and if during cooling 150 grams of sodium hydroxid are added, 123 grams of tripolyphosphate are obtained by crystallization, filtration and drying by air, which corresponds to a yield of about 88%; in reality, the yield is even higher, since because of the solubility of the polyphosphate of approximately 1% about further 5 grams remain in solution.

Thus, it is evident that pyrophosphate and metaphosphate react with each other in the solid state. For a complete conversion of the melt into sodium tripolyphosphate it would therefore be necessary to expend very considerable time in cooling; even a working charge, in which large amounts are melted and slowly cooled, contains, especially in the border zone, which solidifies more rapidly than the interior of a melting block, still large amounts of pyrophosphate. The 100% production of $Na_5P_3O_{10}$ can be obtained in the following simple ways.

Either, the rapidly cooled $5Na_2O.3P_2O_5$-melt mainly consisting of meta- and pyrophosphates is tempered for several hours below the melting point, by being subsequently heated once more to temperatures between 250° C. and 650° C.

Or, the $5Na_2O.3P_2O_5$-melt, which by slow cooling has decomposed into powder, is tempered for several hours at temperatures below the melting point while the material is constantly kept moving.

Or, the original melt is tempered by being slowly cooled before complete solidification while being constantly stirred, whereby the primarily solidified pyrophosphate is uniformly distributed in the material.

In all these cases the yield of anhydrous $Na_5P_3O_{10}$ is practically 100%, while the yield of crystallized $Na_5P_3O_{10}.8H_2O$. by the introduction of the glow product into a sodium salt containing solution or mother liquor is likewise 99% to 100%. 100 kilograms of the tempered glow product $5Na_2O.3P_2O_5$ when gradually introduced into 100 liters of a 15% common salt solution, which is maintained cool, yield 138 kilograms of the air dried crystallized tripolyphosphate.

The crystallisability of the glow products and their aqueous solution, and their ability to be salted out is also the characteristic for the conversion, caused by the tempering, in accordance with our invention, of all completely or partly amorphous melts whose $Na_2O:P_2O_5$ proportion lies between 1:1 and 2:1 into polyphosphates.

The advantages possessed by the polyphosphates as detergents, cleansing and water softening means, are not restricted by this manufacturing process to pure polyphosphates, but also are found in polyphosphate mixtures because of the high efficiency of these products. This, for instance, appears from the following comparison between meta- and polyphosphate.

2.98 grams of $Na_5P_3O_{10}$ (containing 57.88% $P_2O_5$) make a turbid lime-soap suspension of 1 gram of pure potash soap in 1 liter of water of 20° hardness at a temperature of 70° C. and with a pH of 9.0 limpid. To obtain the same effect, 3.35 grams of $(NaPO_3)_6$ (containing 69.61% $P_2O_5$) are required under the same conditions and likewise with a pH of 9.0, while it may be noted that for the purpose of obtaining said pH value an alkaline agent must be added to the acid meta phosphate, whereby, of course, the expenditure of material is still further increased; in other words, in order to obtain the effect, produced by 74 parts of $P_2O_5$ in $Na_5P_3O_{10}$, there are required 100 parts of $P_2O_5$ in $(NaPO_3)_6$.

A further advantage of the crystalline, especially of the crystallized polyphosphate $Na_5P_3O_{10}.8H_2O$ obtained from sodium salt solutions is the characteristic not to attract any water from the air and even to decompose the air, whereas the hygroscopicity of the amorphous metaphosphate makes the same useless for many purposes, e. g. as an addition to shampoo powder. This and other valuable characteristics of the tripolyphosphate make it also very adapted when mixed with $Na_4P_2O_7$, which has its particular characteristics.

Also the mixtures of the $Na_5P_3O_{10}$ with other polyphosphates, e. g. with compounds containing less than $5Na_2O$ to $3P_2O_5$ have an especially high efficiency, which makes the technical production of such mixture likewise of great value. These compounds are obtained by this that the extremely slow cooling or the tempering below the solidifying temperature is not continued to 250° C. or even to room temperature, but is interrupted at an intermediate temperature range between 650° and 400° C.

A mixture of tetrapolyphosphate $Na_6P_4O_{13}$ and tripolyphosphate $Na_5P_3O_{10}$ is formed, if a melt, whose $Na_2O:P_2O_5$-proportion lies between 3:2 and 5:3 is extremely slowly cooled only to the extent that it is just solidified, whereupon it is rapidly cooled or chilled. The same high-grade mixture of tetra- and tri-polyphosphate is, of course, also obtained, if a rapidly cooled melt of the above composition is immediately tempered for a long time below the solidifying point and subsequently is rapidly cooled.

The advantage of the heat treatment in accordance with the present invention and the technical effect obtained thereby especially clearly appear, when polyphosphate is made from a melt which contains $Na_2O$ and $P_2O_5$ in the proportion of 3:2. A product is used which is obtained by the chilling of a $3Na_2O.2P_2O_5$-melt. If this is tempered for several hours at 500° C., it is converted into a mixture of 78% tripolyphosphate and 22% trimetaphosphate, and it possesses a lime-soap value of 3.95, that is to say, 3.95 kilograms of this glow product are required to make a lime-soap suspension of 1 gram of potash soap in 1 liter of water of 20° hardness perfectly limpid. If the same initial material is tempered at 575° C. and rapidly cooled, a product is formed consisting mostly of tetrapolyphosphate $Na_6P_4O_{13}$ and possessing a lime-soap value of 2.72 grams, that is to say, only 2.72 grams of this product are required to produce the same effect as 3.95 grams of the material tempered at 525° C. (or extremely slowly cooled).

If it is considered that the corresponding lime-soap value of the original melt solidified by chilling is 4.15, that is to say, that 4.15 grams of the product produced by the old methods are required to completely soften 1 liter of water of 20° hardness at 70° C., it is a great advance in the state of the art to produce, in accordance with the present invention, a mixture consisting essentially of tri- and tetra-polyphosphate. The present invention, therefore, comprises the heat treatment and the crystallisation of all completely or partially amorphous sodium phosphate melts in which the proportion of $Na_2O:P_2O_5$ lies between 1:1 and 2:1.

We claim:

1. The process for the preparation of sodium tripolyphosphate corresponding to the formula $Na_5P_3O_{10}$ from a sodium phosphate melt having a stoichiometric $Na_2O:P_2O_5$ ratio of 1.667 comprising cooling the melt to bring it to the solidification point, and then further cooling it at an extremely slow rate below the softening temperature but above 300° C. until substantially complete conversion to tripolyphosphate form is achieved.

2. The process for the preparation of sodium tripolyphosphate corresponding to the formula $Na_5P_3O_{10}$ from a sodium phosphate melt having a stoichiometric $Na_2O:P_2O_5$ ratio of 1.667 comprising cooling the melt to bring it to the solidification point from the liquid state while continuously agitating, and then further cooling it at an extremely slow rate below the softening temperature but above 300° C. until substantially complete conversion to tripolyphosphate form is achieved.

3. The process for the preparation of sodium tripolyphosphate corresponding to the formula $Na_5P_3O_{10}$ from a sodium phosphate melt having a stoichiometric $Na_2O:P_2O_5$ ratio of 1.667 comprising cooling the melt to bring it to the solidification point, and then re-heating it below the softening temperature but above 300° and again cooling it at an extremely slow rate within the said temperature range until substantially complete conversion to tripolyphosphate form is achieved.

FERDINAND BORNEMANN.
HANS HUBER.